US012693912B2

(12) United States Patent
Ghergu et al.

(10) Patent No.: US 12,693,912 B2
(45) Date of Patent: Jul. 28, 2026

(54) AUTOMATICALLY GENERATING APPLICATION PROGRAMMING INTERFACES

(71) Applicant: INTERNATIONAL BUSINESS MACHINES CORPORATION, Armonk, NY (US)

(72) Inventors: Laurentiu Gabriel Ghergu, Bucharest (RO); Natalie Brooks Powell, Bolingbrook, IL (US); Karthik Muthuraman, San Francisco, CA (US); Marian I Tataru, Cedar Park, TX (US)

( * ) Notice: Subject to any disclaimer, the term of this patent is extended or adjusted under 35 U.S.C. 154(b) by 451 days.

(21) Appl. No.: 17/966,150

(22) Filed: Oct. 14, 2022

(65) Prior Publication Data

US 2024/0126624 A1     Apr. 18, 2024

(51) Int. Cl.
*G06F 9/54* (2006.01)

(52) U.S. Cl.
CPC .................................. *G06F 9/543* (2013.01)

(58) Field of Classification Search
None
See application file for complete search history.

(56) References Cited

U.S. PATENT DOCUMENTS

| | | | |
|---|---|---|---|
| 7,197,739 B2 | 3/2007 | Preston et al. | |
| 8,504,543 B1 | 8/2013 | Andreessen et al. | |
| 9,619,209 B1 | 4/2017 | Allen et al. | |
| 9,766,868 B2 | 9/2017 | Allen et al. | |
| 9,851,952 B2 | 12/2017 | Rodrigues et al. | |

| | | | |
|---|---|---|---|
| 10,127,224 B2 | 11/2018 | Deleeuw | |
| 10,552,540 B2 | 2/2020 | Marascu et al. | |
| 10,719,374 B1 | 7/2020 | Mathur et al. | |
| 10,843,080 B2 | 11/2020 | Hsiao | |
| 10,922,357 B1 * | 2/2021 | Chennuru | G06F 16/2457 |
| 10,956,130 B2 | 3/2021 | Rizo et al. | |
| 11,016,740 B2 | 5/2021 | Apte et al. | |
| 2005/0267871 A1 * | 12/2005 | Marchisio | G06F 16/3338 |
| 2013/0268260 A1 * | 10/2013 | Lundberg | G06F 40/58 |
| | | | 704/8 |
| 2016/0092173 A1 * | 3/2016 | Rodrigues | H04L 67/00 |
| | | | 717/106 |
| 2017/0102861 A1 | 4/2017 | Redenbach et al. | |
| 2017/0235599 A1 * | 8/2017 | Raghu | G06F 9/543 |
| | | | 718/102 |
| 2019/0034172 A1 | 1/2019 | Kostello | |
| 2019/0243692 A1 * | 8/2019 | Lincoln | G06F 9/541 |
| 2019/0391792 A1 * | 12/2019 | Sabharwal | G06N 3/08 |
| 2020/0372088 A1 * | 11/2020 | Liu | G06F 16/9532 |

(Continued)

OTHER PUBLICATIONS

Anonymous, "Application Programming Interface (API)", Wikipedia, https://en.wikipedia.org/wiki/API, Sep. 21, 2022, 15 pages.

(Continued)

*Primary Examiner* — Umut Onat
(74) *Attorney, Agent, or Firm* — Seed Intellectual Property Law Group LLP

(57)     ABSTRACT

Techniques for automatically generating an API in response to a natural language input are provided. A method includes: receiving, by a processor set, a natural language input provided via a conversational user interface of a client device; determining, by the processor set, requirements of a new application programming interface (API) by analyzing the natural language input using natural language understanding; and automatically generating, by the processor set, the new API based on the requirements.

15 Claims, 5 Drawing Sheets

(56) References Cited

U.S. PATENT DOCUMENTS

| | | | |
|---|---|---|---|
| 2021/0019306 A1* | 1/2021 | Torres | G06F 16/252 |
| 2021/0089375 A1* | 3/2021 | Ghafourifar | G06F 9/453 |
| 2022/0027566 A1 | 1/2022 | Vaithiyanathan | |
| 2024/0045742 A1* | 2/2024 | Sagar | G06F 9/543 |

OTHER PUBLICATIONS

Anonymous, "Concepts of JSON web services", https://www.ibm.com/docs/en/cics-ts/5.3?topic=services-concepts-ison-web, Oct. 13, 2021, 4 pages.

Anonymous, "Concepts of RESTful JSON web services", https://www.ibm.com/docs/en/cics-ts/5.3?topic=services-concepts-restful-json-web, Nov. 9, 2021, 3 pages.

Anonymous, "Natural-language understanding", Wikipedia, https://en.wikipedia.org/wiki/Natural-language_understanding, May 2, 2022, 6 pages.

Anonymous, "Programming language", Wikipedia, https://en.wikipedia.org/wiki/Programming_language, Sep. 22, 2022, 22 pages.

Anonymous, "Web service (WS)", Wikipedia, https://en.wikipedia.org/wiki/Web_service, Jul. 20, 2022, 7 pages.

Anonymous, "Message Brokers", IBM Cloud Education, https://www.ibm.com/cloud/learn/message-brokers, Jan. 23, 2020, 8 pages.

Anonymous, "What is a Conversational User Interface (CUI)?", Alan Blog, https://alan.app/blog/what-is-conversational-user-interface-cui/, accessed Sep. 25, 2022, 20 pages.

Bush, "What Is The Difference Between Web Services and APIs?", Nordic APIs, https://nordicapis.com/what-is-the-difference-between-web-services and apis/, Jul. 16, 2019, 9 pages.

* cited by examiner

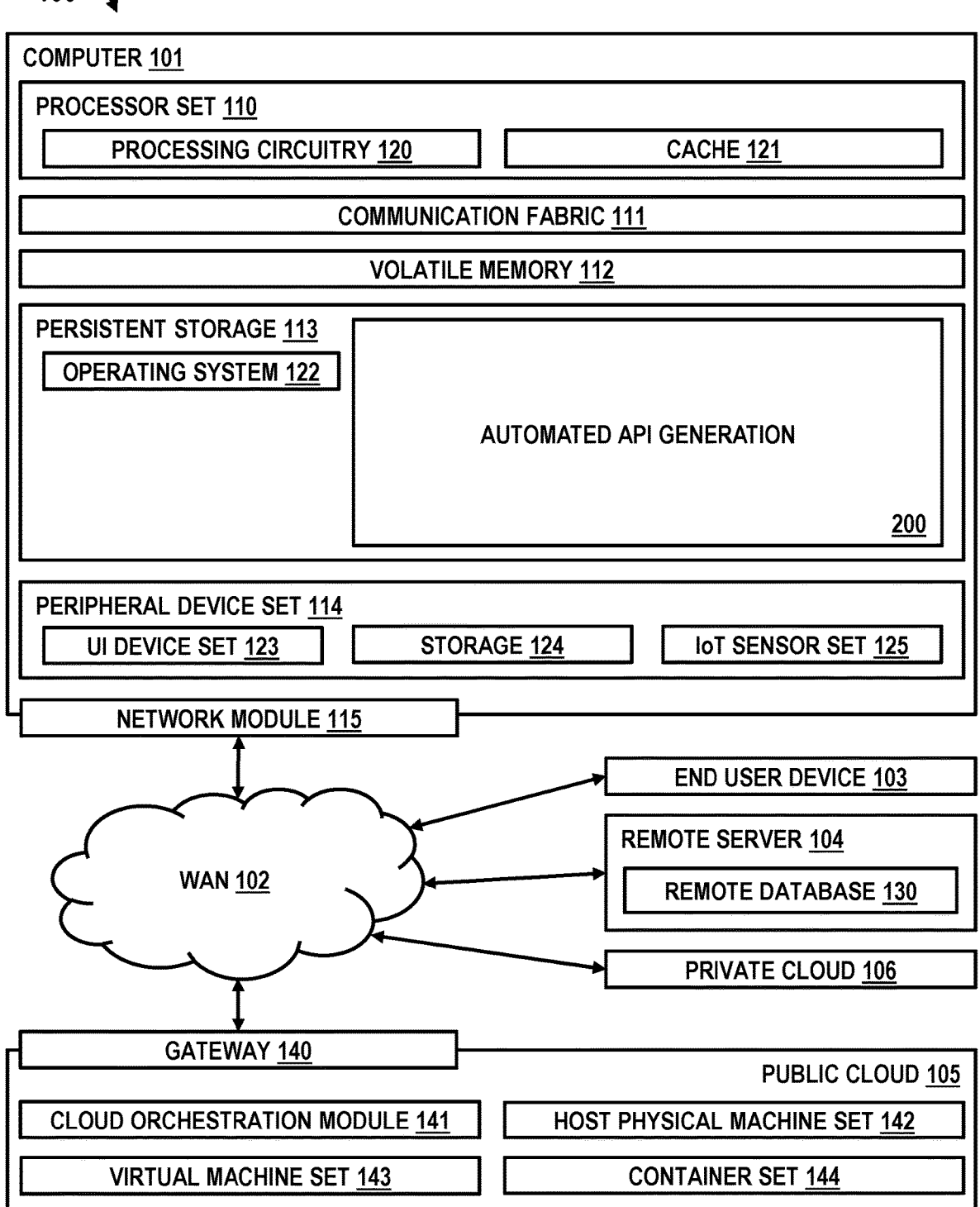

100

COMPUTER 101

PROCESSOR SET 110

PROCESSING CIRCUITRY 120     CACHE 121

COMMUNICATION FABRIC 111

VOLATILE MEMORY 112

PERSISTENT STORAGE 113

OPERATING SYSTEM 122

AUTOMATED API GENERATION

200

PERIPHERAL DEVICE SET 114

UI DEVICE SET 123     STORAGE 124     IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141     HOST PHYSICAL MACHINE SET 142

VIRTUAL MACHINE SET 143     CONTAINER SET 144

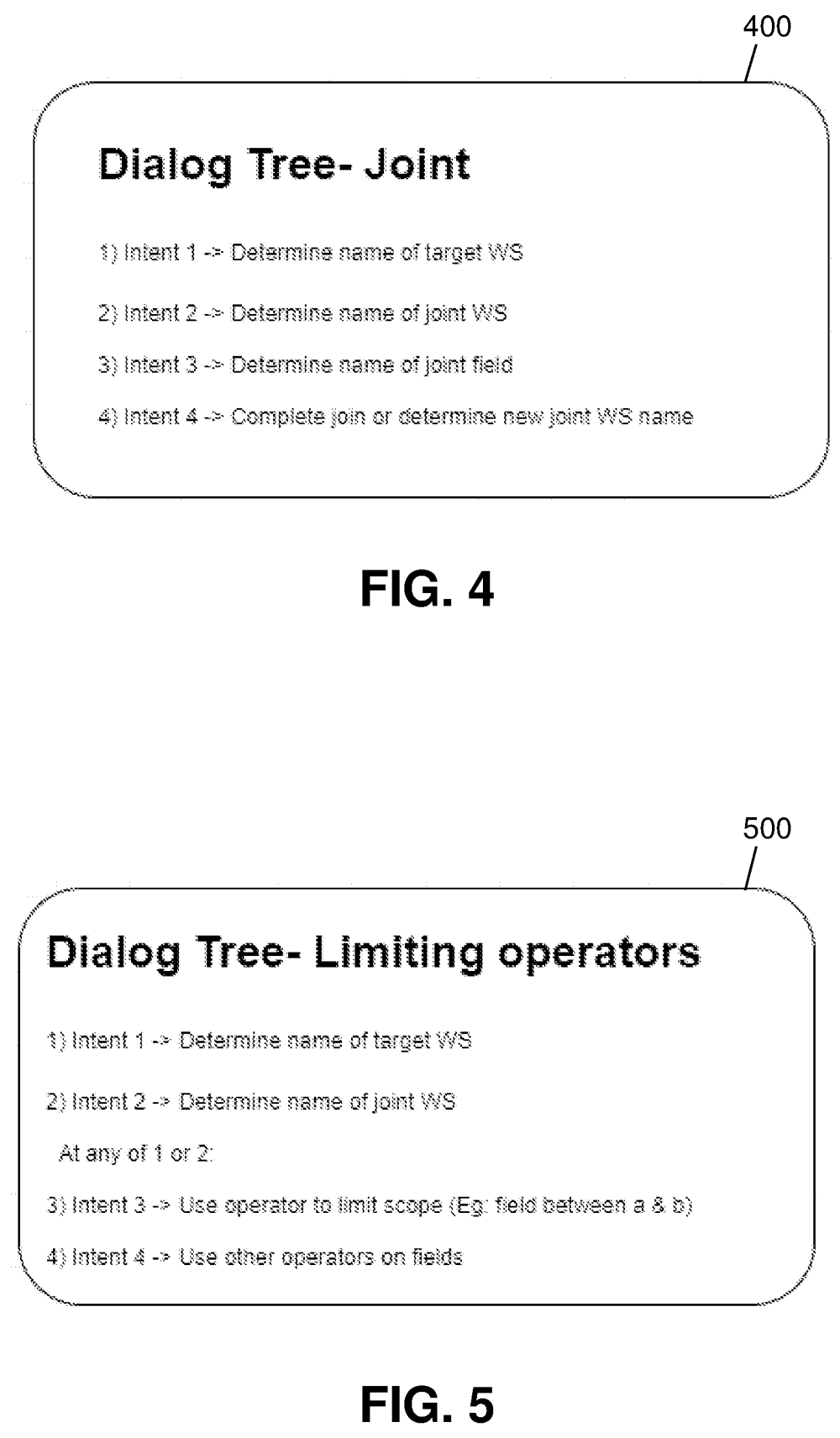

Dialog Tree- Joint

1) Intent 1 -> Determine name of target WS

2) Intent 2 -> Determine name of joint WS

3) Intent 3 -> Determine name of joint field

4) Intent 4 -> Complete join or determine new joint WS name

Dialog Tree- Limiting operators

1) Intent 1 -> Determine name of target WS

2) Intent 2 -> Determine name of joint WS

At any of 1 or 2:

3) Intent 3 -> Use operator to limit scope (Eg: field between a & b)

4) Intent 4 -> Use other operators on fields

FIG. 5

AUTOMATICALLY GENERATING APPLICATION PROGRAMMING INTERFACES

BACKGROUND

Aspects of the present invention relate generally to networked computing systems and, more particularly, to automatically generating application programming interfaces.

Applications increasingly consume services via application programming interfaces (APIs) in cloud-provided runtimes. A cloud-provided runtime (also called a cloud runtime) is a category of cloud computing service that provides a platform allowing customers to develop, run, and manage applications without the complexity of building and maintaining the infrastructure typically associated with developing and launching an application.

A server-side web API is a programmatic interface consisting of one or more publicly exposed endpoints to a defined request-response message system, typically expressed in JavaScript Object Notation (JSON) or Extensible Markup Language (XML) and exposed via the web by means of a Hypertext Transfer Protocol (HTTP-based) web server. Endpoints specify where resources lie that may be accessed by third party software. The access is usually via a Universal Resource Locator (URL) to which HTTP requests are posed, and from which a corresponding response is expected.

APIs are the main method in which independent software applications exchange data. Examples of APIs include representational state transfer (REST) APIs and web services implemented as simple object access protocol (SOAP) APIs.

REST APIs are traditionally coded using an approach that involves defining a model, creating an API file with the definition of the model, and exposing data for consumption under various formats such as JSON, XML, etc. SOAP APIs (also called SOAP web services or just web services) are created in a similar manner in which programmers manually write the code that exposes data via the defined SOAP interfaces.

SUMMARY

In a first aspect of the invention, there is a computer-implemented method including: receiving, by a processor set, a natural language input provided via a conversational user interface of a client device; determining, by the processor set, requirements of a new application programming interface (API) by analyzing the natural language input using natural language understanding; and automatically generating, by the processor set, the new API based on the requirements.

In another aspect of the invention, there is a computer program product including one or more computer readable storage media having program instructions collectively stored on the one or more computer readable storage media. The program instructions are executable to: receive a natural language input provided via a conversational user interface of a client device; determine requirements of a new application programming interface (API) by analyzing the natural language input using natural language understanding; and automatically generate the new API based on the requirements.

In another aspect of the invention, there is system including a processor set, one or more computer readable storage media, and program instructions collectively stored on the one or more computer readable storage media. The program instructions are executable to: receive a natural language input provided via a conversational user interface of a client device; determine requirements of a new application programming interface (API) by analyzing the natural language input using natural language understanding; and automatically generate the new API based on the requirements.

BRIEF DESCRIPTION OF THE DRAWINGS

Aspects of the present invention are described in the detailed description which follows, in reference to the noted plurality of drawings by way of non-limiting examples of exemplary embodiments of the present invention.

FIG. 1 depicts a computing environment according to an embodiment of the present invention.

FIGS. 4 and 5 show exemplary dialog trees in accordance with aspects of the invention.

DETAILED DESCRIPTION

Figure 2:
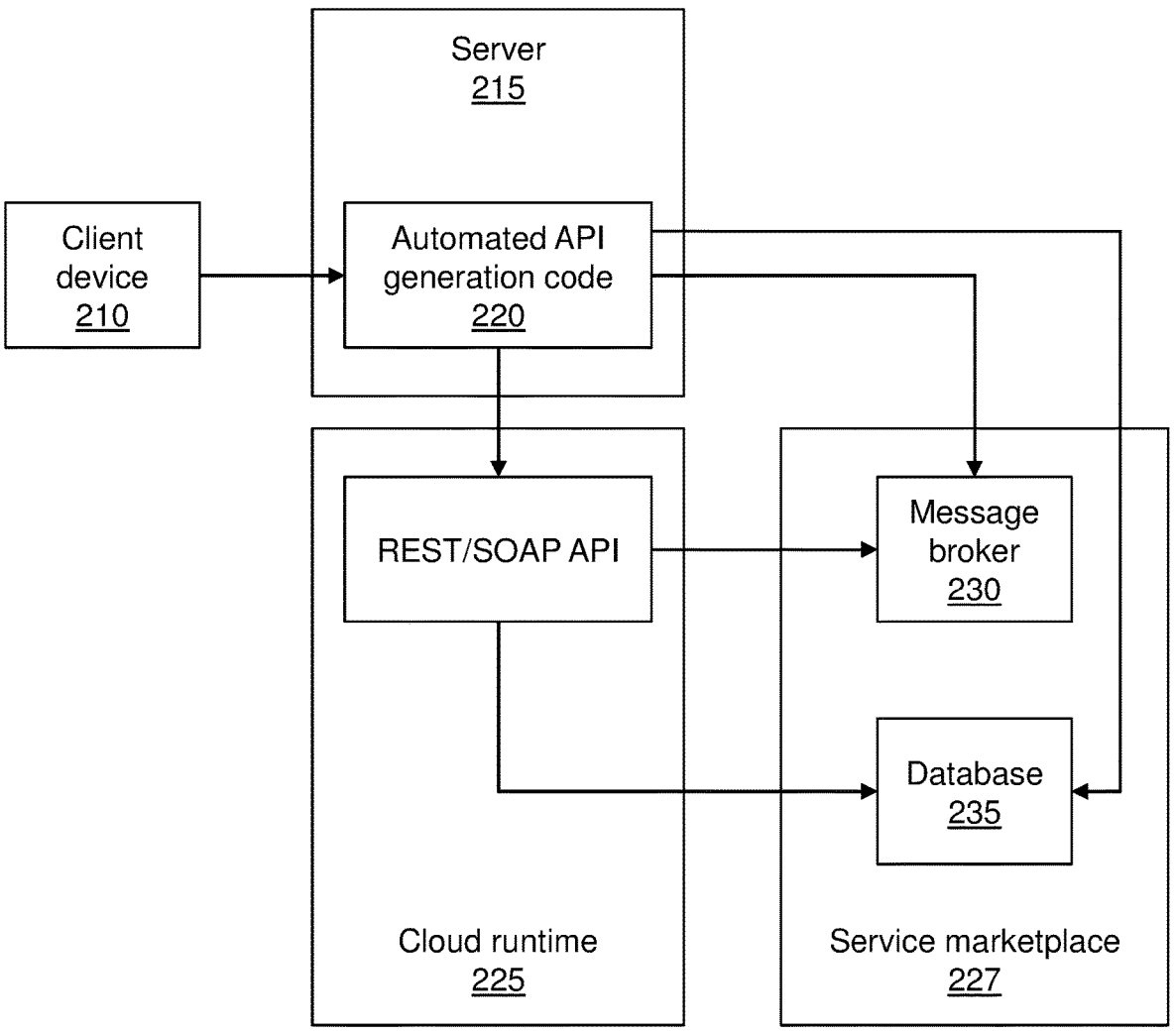
FIG. 2 shows a block diagram of an exemplary environment in accordance with aspects of the invention.

Aspects of the present invention relate generally to networked computing systems and, more particularly, to automatically generating application programming interfaces (APIs). Manually writing APIs, such as SOAP APIs and REST APIs, is time consuming and sometimes repetitive work. API functions that are coded by a developer who is writing an API may include validation rules on input parameters, a query on a database, and marshalling or unmarshalling data to and from various formats. Some techniques expose databases as web services; however, there are no techniques to automatically generate a web service based on high-level goals expressed by a developer in natural language. Low-code API creation systems involve using a graphic user interface to create an API. A drawback of these systems is that the developer must be familiar with and understand how to use the complex and technical graphic user interface, and any offering created this way is not automatically deployed to others.

Aspects of the invention address these drawbacks of conventional techniques by providing a service for automatic composition and generation of APIs, such as SOAP APIs and REST APIs. In embodiments, a system uses natural language understanding (NLU) to derive API requirements from language written in natural language by a developer. In accordance with aspects of the invention, in response to deriving API requirements in this manner, the system automatically generates and deploys an API that includes the API requirements. When generating an API in this manner, the system may also take into account the data sources on which the API will rely. Aspects of the invention reduce the complexity of creating a new API by permitting the developer to write requirements for the new API in natural language rather than writing the new API from the ground up in programming language. In this manner, implementations of the invention provide an improvement in the field of APIs by providing a system that makes it easier for developers to generate new APIs.

According to aspects of the invention there is a system and method for automatically generating SOAP APIs or REST APIs by specifying the requirements of the API in natural language. In embodiments, the generated code of the API is accessible by developers. In embodiments, the system automatically deploys the generated code in a production environment. In embodiments, a developer can request that data is migrated from a plurality of REST APIs or SOAP APIs into a new REST API or SOAP API. In embodiments, the system automatically generates the infrastructure migrating the data.

Implementations of the invention involve concepts that are necessarily computer-based and do not have a human analog. For example, an API is a software mechanism for two or more computer programs to communicate with each other. It is a type of software interface, offering a service to other pieces of software, and cannot be performed in the human mind or with pen and paper. Moreover, natural-language understanding (NLU) is a subtopic of natural-language processing in artificial intelligence that deals with machine reading comprehension and, thus, is a computer-based process that cannot be performed in the human mind or with pen and paper.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as automated API generation 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

FIG. 2 shows a block diagram of an exemplary system 205 in accordance with aspects of the invention. In embodiments, the system 205 includes a client device 210 used by a developer that wishes to create a new API, a server 215 running automated API generation code 220, a cloud runtime 225, and a service marketplace 227 including one or more data sources such as one or more message brokers 230 and one or more databases 235.

In accordance with aspects of the invention, the server 215 comprises the automated API generation code 220 that is configured to perform processes described herein, including but not limited to: receiving a natural language input provided via a conversational user interface of a client device; determining requirements of a new application programming interface (API) by analyzing the natural language input using natural language understanding; automatically generating the new API based on the requirements. In one example, the server 215 is one or more computing devices each including one or more elements of the computer 101 of FIG. 1. In another example, the server 215 is one or more virtual machines (VMs) or containers running on one or more computing devices. In embodiments, the automated API generation code 220 comprises computer code (e.g., such as code represented by block 200 of FIG. 1) running on the server 215.

The client device 210 comprises a computing device such as a smartphone, desktop computer, laptop computer, tablet computer, etc., and may comprise an instance of the end user device 103 of FIG. 1. In embodiments, the client device 210 runs a client application that communicates with the automated API generation code 220 to provide automated API generation functionality to the users of the client device 210. In one example, the client application comprises a program that is specifically related to the automated API generation code 220, e.g., as part of a same software product. In another example, the client application is a browser application that provides web-based access to the automated API generation code 220. In embodiments, and in both examples, the client application and the automated API generation code 220 communicate with each other to provide a user with automated API generation functionality as described herein.

Still referring to FIG. 2, each of the message broker 230 and the database 235 may be hosted by a remote server such as remote server 104 of FIG. 1. The database 235 may comprise a Structured Query Language (SQL) database or a NoSQL database. There may be plural different databases 235 in the environment 205. The message broker 230 may comprise software that enables applications, systems, and services to communicate with each other and exchange information by translating messages between formal messaging protocols. In embodiments, the message broker 230 manages communications between on-premises systems and cloud components in hybrid cloud environments. There may be plural different message brokers 230 in the environment 205.

In embodiments, the cloud runtime 225 comprises a cloud computing service that provides a platform allowing customers to develop, run, and manage applications without the complexity of building and maintaining the infrastructure typically associated with developing and launching an application. A network or combination of networks, such as the WAN 102 of FIG. 1, may provide network communication between various ones of the devices in the environment 205.

In accordance with aspects of the invention, the automated API generation code 220 automatically analyzes a data source, such as message broker 230 or database 235, and exposes the data of the data source as REST APIs. In an example of a relational database, the automated API generation code 220 does this by analyzing the schema of the relational database and then deploying a REST API that exposes all the data in the tables. These can be automatically deployed on a web server in either a cloud or on-premises scenario.

In accordance with aspects of the invention, the client application running on the client device 210 provides a conversational user interface (CUI) in which the developer can specify, using natural language rather than programming language, composition requirements for new types of web services. For example, a developer can provide a natural language input via the conversational user interface to request that a new REST API is generated and deployed that will allow access to joined data from two other existing REST APIs. The input may be typed or spoken. In embodiments, the system allows developers to specify multiple composition rules by expressing these requirements in natural language in the conversational user interface. Examples of such requirements include but are not limited to joining data on a specific field, limiting results between two values, and additional web service specific features like sorting and pagination.

In accordance with aspects of the invention, the automated API generation code 220 derives requirements from the developer's natural language input by analyzing the input using natural language understanding. In embodiments, based on deriving the requirements, the automated API generation code 220 automatically generates code of new API that meets the requirements. In embodiments, the automated API generation code 220 provides the developer with access to the code of the new API. Depending on the user preference, the automated API generation code 220 can offer a feature during the deployment of the new API in which code is generated for the associated infrastructure (e.g., such as a database instance in a cloud foundry environment, etc.). The system can also be configured to achieve migration of data from one web service to a newly created web service by downloading and merging all data from the first two services into the newly created one.

In this manner, implementations of the invention may be used to provide a system and method for automatically generating SOAP APIs or REST APIs by specifying the requirements in natural language, wherein the code of the generated API is accessible by developers and wherein the system automatically deploys the code of the generated API in a production environment. As described herein, the system may be configured such that a developer can request that data is migrated from a plurality of REST APIs or SOAP APIs into a new REST API or SOAP API. Implementations provide an advantage over conventional API development systems in that developers utilize the inventive system using natural language and do not need to be trained on how to create REST APIs or SOAP APIs using programming languages. Another advantage is that developers do not need to be trained on specific systems used to create compositions. Another advantage is that the system can be an offering for microservices architectures. Another advantage is that the system automatically generates REST APIs and SOAP APIs without requiring the user to be technical. For example, a non-technical business user can use the system to create a new API that generates reports from data sources, even though the user has no experience with programming or API creation.

Figure 3:
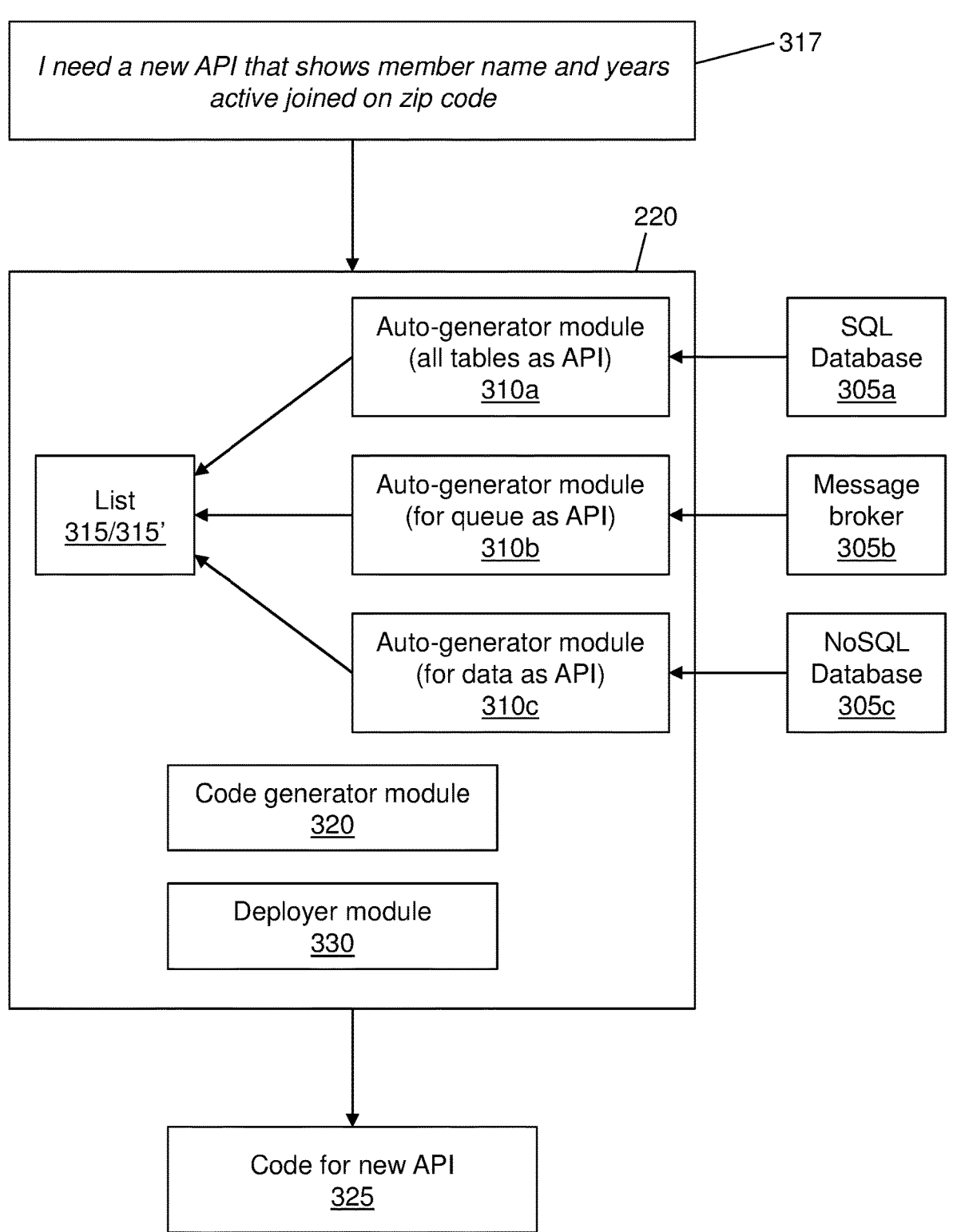
FIG. 3 shows a block diagram of an exemplary environment in accordance with aspects of the invention.

FIG. 3 shows a block diagram of an exemplary environment 300 in accordance with aspects of the invention. In embodiments, the environment 300 includes data sources such as SQL (e.g., relational) database 305a, message broker 305b, and NoSQL (e.g., non-relational) database 305c. In embodiments, the environment 300 includes auto-generator modules 310a, 310b, 310c that automatically generate web services that expose data in the data sources 305a, 305b, 305c. The auto-generator modules 310a, 310b, 310c may comprise one or more modules of automated API generation code 220 of FIG. 2. In one example, the auto-generator modules 310a, 310b, 310c are plug-ins to an integrated development environment (IDE) that is accessed by a developer using client device 210 of FIG. 2. The automated API generation code 220 may include additional or fewer modules than those shown in FIG. 3. In embodiments, separate modules may be integrated into a single module. Additionally, or alternatively, a single module may be implemented as multiple modules.

In accordance with aspects of the invention, the auto-generator modules 310a, 310b, 310c are configured to automatically expose data in the data sources 305a, 305b, 305c using different approaches for different types of data source. For example, the auto-generator module 310a may expose data of the SQL database 305a by extracting a schema of the database, identifying a list of tables from the schema, and then for each table exposing an independent REST API endpoint that allows a user to query the table. The REST API may be configured to allow various standard operations such as querying where a column matches a specific value, where a column value is between two other values, etc. In another example, the auto-generator module 310c may expose data of the NoSQL database 305c by providing a generic REST endpoint that has features similar to the database endpoint. The endpoint allows a user to query the database and return JSON objects. The auto-generator module 310b may create a REST API to expose data of the message broker 305b in a similar manner.

With continued reference to FIG. 3, in a REST API embodiment, the automated API generation code 220 creates a list 315 that includes all the REST APIs created by the auto-generator modules 310a, 310b, 310c. In embodiments, each REST API in the list 315 is tagged with metadata that describes the data (of one of the data sources) that is exposed by the respective REST API. The tagging can be performed manually and/or automated by analyzing and classifying the data exposed by each REST API.

Alternatively, in a SOAP API embodiment, the list 315' includes SOAP APIs (e.g., web services) created by the auto-generator modules 310a, 310b, 310c. In the SOAP API embodiment, the SOAP APIs to be included in the list 315' are created by the auto-generator modules 310a, 310b, 310c based on analyzing REST APIs associated with the data sources. For example, the auto-generator module 310c may dynamically analyze a REST API that exposes data of the NoSQL database 305c to determine what type of request and response is utilized by the REST API. In this example, the auto-generator module 310b generates a SOAP API that exposes the same data in the NoSQL database 305c as does the REST API. For example, the auto-generator module 310b may be programmed to analyze a JSON object returned by the REST API to determine types of attributes in the object, write each determined type of attribute in a WSDL document, and create the new SOAP web service using the WSDL document. In embodiments, each SOAP API in the list 315' is tagged with metadata that describes the data (of one of the data sources) that is exposed by the respective SOAP API. The tagging can be performed manually and/or automated by analyzing and classifying the data exposed by each SOAP API.

In both embodiments (e.g., REST API using list 315 and SOAP API using list 315'), the automated API generation code 220 receives natural language input from a conversational user interface 317 (e.g., from the client device 210 of FIG. 2), determines requirements for a new API from the natural language input, and uses the determined requirements to generate a new API as a composition of two APIs in the list 315/315'. In embodiments, the automated API generation code 220 determines the requirements by analyzing the natural language input using natural language understanding to determine an intent of the developer providing the input to the conversational user interface. The natural language understanding may utilize a classification model such as a machine learning classification model that is trained to classify the natural language input into various different intents. In one example, the automated API generation code 220 performs the natural language understanding by preprocessing the text of the natural language input, for example by tokenizing a sentence (e.g., splitting the sentence into words and space delimiters) and removing stop words (e.g., "a", "an", "the", etc.). In this example, the automated API generation code 220 then matches the tokens (e.g., words) from the natural language input to the metadata tags of the respective ones of the APIs included in the lists 315/315'. Based on this matching, the automated API generation code 220 determines which APIs from the list to use as the basis for generating a new API in response to the developer's request.

For example, in the REST API embodiment, database table names of databases exposed by the REST APIs included in the list 315 may be categorized with metadata tags that indicate what type of data the table holds. In this manner, when a developer makes a natural language request for a new API via the conversational user interface, the automated API generation code 220 tokenizes the natural language and classifies the identified tokens that match the database table names. In this example, if the classification model predicts the same metadata tags, then the system identifies this as a match and uses the API associated with that table when generating the new API in response to the developer request.

In both embodiments (e.g., REST API using list 315 and SOAP API using list 315'), the determined requirements include first data from the data sources 305a, 305b, 305c, second data from the data sources 305a, 305b, 305c, and a joint field. In embodiments, the first data is data in one of the data sources that is exposed by a first one of the APIs in the list 315, the second data is data in one of the data sources that is exposed by a second one of the APIs in the list 315, and the joint field is a common attribute that is returned with both the first data and the second data. In embodiments, the automated API generation code 220 uses the determined requirements to identify a target API and a joint API from the list 315/315'. For example, a developer may type a natural language statement into the conversational user interface, "I need a new API that shows member name and years active joined on zip code." In this example, the automated API generation code 220 uses natural language understanding to determine that the requirements include "member name", "years active", and a joint field that contains "zip code". In this example, the automated API generation code 220 identifies a first API in the list 315 that returns member name and zip code, e.g., by comparing the terms "member name" and "zip code" to metadata tags of each of the APIs in the list 315. In this example, the automated API generation code 220 also identifies a second API in the list 315 that returns years active and zip code, e.g., by comparing the terms "years active" and "zip code" to metadata tags of each of the APIs in the list 315. In this example, based on identifying the first API and the second API from the list in this manner, the automated API generation code 220 generates a new API that is a composition of the first API and the second API joined using the joint field. In the REST API embodiment, the new API is a REST API that is a composition of two REST APIs from the list 315. In the SOAP API embodiment, the new API is a SOAP API that is a composition of two SOAP APIs from the list 315'. In this manner, the output of the new API is the output of the two source APIs (i.e., the target API and the joint API) joined on the common attribute (i.e., the joint field).

In both embodiments (e.g., REST API using list 315 and SOAP API using list 315'), the automated API generation code 220 may include a code generator module 320 that generates source code 325 for the new API in a pre-defined programming language such as Java, Node.js, XML, etc. In both embodiments (e.g., REST API using list 315 and SOAP API using list 315'), the automated API generation code 220 may include an auto-deployer component (e.g., deployer module 330) that automatically generates infrastructure for the new API on a cloud or on-premises system. This may be done, for example, by creating and executing a script (e.g., an Ansible script) that deploys the code of the new API on a service in the target infrastructure.

In both embodiments (e.g., REST API using list 315 and SOAP API using list 315'), the automated API generation code 220 may determine one or more limiting operators from the natural language input of the user. In embodiments, a limiting operator comprises a filter that limits an amount of data returned by the new API. For example, the developer may input "I need a new API that shows member name and years active joined on zip codes that begin with 22" in the conversational user interface. As with the previous example, the automated API generation code 220 uses natural language understanding to determine that the requirements include "member name", "years active", and a joint field that contains "zip code". Additionally in this example, the automated API generation code 220 uses natural language processing to determine that a limiting operator is zip codes beginning with the string "22". In this example, API code generates a new API that has the output of an identified target API and an identified joint API joined on the common attribute (i.e., the joint field), and filtered to return only data that satisfies the limiting operator (i.e., zip codes that begin with 22). Other limiting operators may be used to filter the returned results of the new API.

In embodiments, the system may utilize various dialog trees via the conversational user interface to refine the determination of the requirements from the natural language input. FIG. 4 shows an exemplary dialog tree 400 for training a conversation agent of the conversational user interface to determine a user's intent on composing two or more APIs into a single, new API. FIG. 5 shows an exemplary dialog tree 500 that allows the new API to contain only data which is filtered from the original plurality of APIs on which it was generated. Additional dialog trees can be trained to allow developers to specify the requirements of a new API in natural language.

Figure 6:
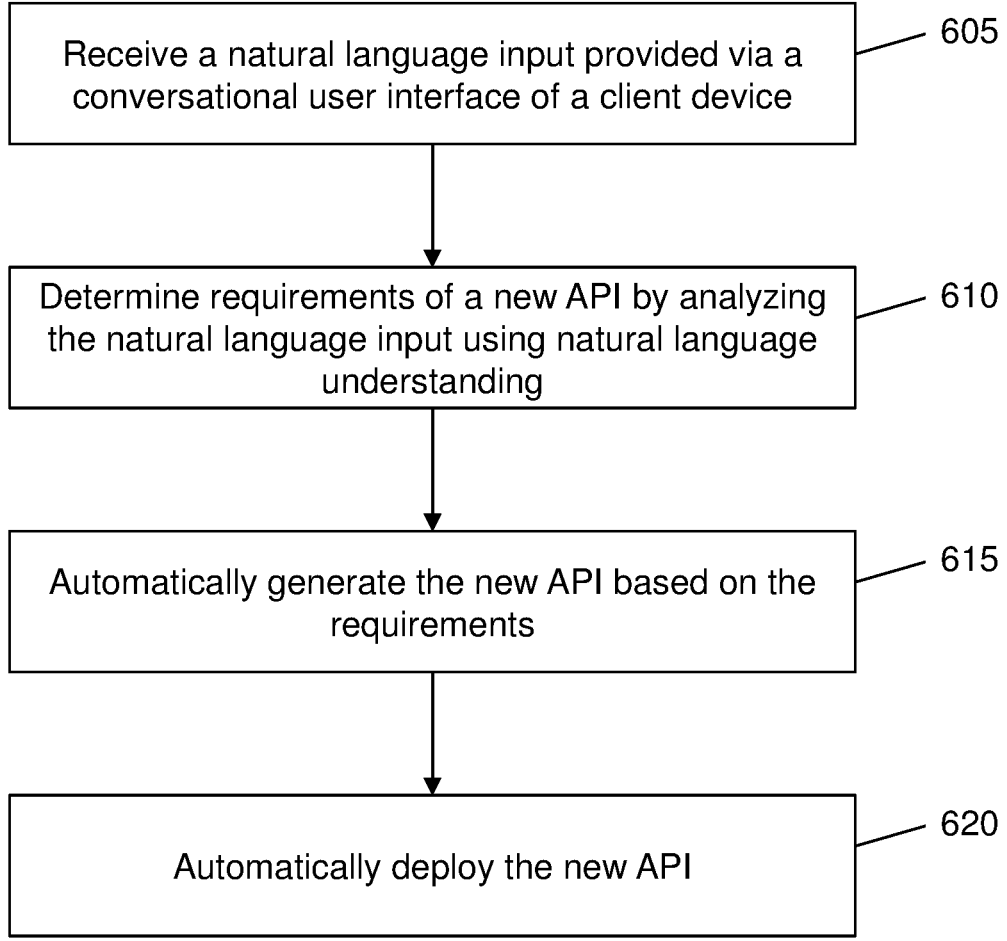
FIG. 6 shows a flowchart of an exemplary method in accordance with aspects of the invention.

FIG. 6 shows a flowchart of an exemplary method in accordance with aspects of the present invention. Steps of the method may be carried out in the environments of FIGS. 2 and 3 and are described with reference to elements depicted in FIGS. 2 and 3.

At step 605, the system receives a natural language input provided via a conversational user interface of a client device. In embodiments, and as described herein, the automated API generation code 220 receives the natural language input via a conversational user interface 317. In embodiments, the input is a statement or a request to create a new API.

At step 610, the system determines requirements of a new API by analyzing the natural language input (from step 605) using natural language understanding. In embodiments, and as described herein, the automated API generation code 220 analyzes the natural language input to determine what data the developer wants returned by the new API and a joint filed on which to join the returned data.

At step 615, the system automatically generates the new API based on the requirements from step 610. In embodiments, and as described herein, the automated API generation code 220 identifies at least two APIs from a list of APIs by comparing the determined requirements to metadata tags of the APIs included in the list of APIs. In embodiments, and as described herein, code generator module 320 generates source code of the new API in a pre-defined programming language.

The new API generated at step 615 comprises a REST API or a SOAP API. In embodiments, the new API of step 615 comprises a composition of a first API and a second API. In embodiments, the requirements determined at step 610 include: first data; second data; and a joint field. In embodiments, the first API returns the first data and the joint field, the second API returns the second data and the joint field, and the new API returns the first data and the second data joined on the joint field. In embodiments, the requirements further comprise a limiting operator, and the new API limits the return of the first data and the second data based on the limiting operator.

At step 620, the system automatically deploys the new API that was generated at step 615. In embodiments, and as described herein, the automated API generation code 220 automatically generates infrastructure for the new API on a cloud or on-premises system.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer 101 of FIG. 1, can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer 101 of FIG. 1, from a computer readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:

receiving, by a processor set, a natural language input provided via a conversational user interface of a client device;

determining, by the processor set, first data, second data, and a joint field by analyzing the natural language input using natural language understanding by matching tokens to metadata tags; and automatically generating, by the processor set, source code for a new application programming interface (API) that is a composition of a first API that returns the first data and the joint field and a second API that returns the second data and the joint field, wherein the new API returns the first data and the second data joined on the joint field.

2. The method of claim 1, wherein the new API comprises a representational state transfer (REST) API.

3. The method of claim 1, wherein the new API comprises a simple object access protocol (SOAP) API.

4. The method of claim 1, wherein:

the first API and the second API are selected from a list of multiple APIs created by respective auto-generator modules associated with respective data sources.

5. The method of claim 1, wherein:

the method further comprises determining a limiting operator by analyzing the natural language input using natural language understanding; and the new API limits the return of the first data and the second data based on the limiting operator.

6. The method of claim 1, further comprising automatically deploying the new API in a production environment by generating infrastructure for the new API on a cloud or on-premises system.

7. The method of claim 6, wherein the generating infrastructure for the new API comprises creating and executing a script that deploys the source code of the new API on a service in a target infrastructure.

8. A computer program product comprising one or more computer readable storage media having program instructions collectively stored on the one or more computer readable storage media, the program instructions executable to:

receive a natural language input requesting that a new application programming interface (API) be generated, the natural language input being provided via a conversational user interface of a client device;

determine first data, second data, a joint field, and a limiting operator of a new application programming interface (API) by analyzing the natural language input using natural language understanding, wherein the natural language understanding utilizes a machine learning classification model that is trained to classify the natural language input into various different intents by matching tokens to metadata tags; and automatically generate source code of the new API, wherein the new API is a composition of a first API that returns the first data and the joint field and a second API that returns the second data and the joint field, and wherein the new API returns the first data and the second data joined on the joint field.

9. The computer program product of claim 8, wherein the new API comprises one of a representational state transfer (REST) API and a simple object access protocol (SOAP) API.

10. The computer program product of claim 8, wherein:

the first API and the second API are selected from a list of multiple APIs created by auto-generator modules that are configured to generate web services that expose data in multiple data sources; and the list is tagged with metadata that describes which respective ones of the data sources that are exposed by respective ones of the multiple APIs in the list.

11. The computer program product of claim 8, wherein:

the limiting operator comprises a filter that limits an amount of data returned by the new API; and the new API limits the return of the first data and the second data based on the limiting operator.

12. A system comprising:

a processor set, one or more computer readable storage media, and program instructions collectively stored on the one or more computer readable storage media, the program instructions executable to:

receive a natural language input provided via a conversational user interface of a client device;

determine first data, second data, a joint field, and a limiting operator of a new application programming interface (API) by analyzing the natural language input using natural language understanding intents by matching tokens in the requirements to metadata tags, wherein the natural language understanding utilizes preprocessing text of the natural language input by tokenizing a sentence and removing stop words, and then matches the tokens from the natural language input to metadata tags from a list of multiple APIs;

automatically generate, by automated API generation code, source code for the new API, wherein the new API is a composition of a first API that returns the first data and the joint field and a second API that returns the second data and the joint field, and wherein the new API returns the first data and the second data joined on the joint field.

13. The system of claim 12, wherein the new API comprises one of a representational state transfer (REST) API and a simple object access protocol (SOAP) API.

14. The system of claim 12, wherein:

the first API and the second API are selected from the list of multiple APIs created by respective auto-generator modules comprising: a first auto-generator module associated with an SQL database; a second auto-generator module associated with a message broker; and a third auto-generator module associated with a NoSQL database; and the auto-generator modules automatically generate at least one web service that exposes data in multiple data sources.

15. The system of claim 12, wherein:

the limiting operator comprises a filter that limits an amount of data returned by the new API; and the new API limits the return of the first data and the second data based on the limiting operator.

\* \* \* \* \*